United States Patent Office 3,393,163
Patented July 16, 1968

3,393,163
SALTS OF POLYMERIC SECONDARY AMINES
Leonard R. Vertnik and Donald H. Wheeler, Minneapolis, Minn., assignors to General Mills, Inc., a corporation of Delaware
No Drawing. Filed Mar. 8, 1962, Ser. No. 178,240
16 Claims. (Cl. 260—18)

This invention relates to novel salts of polymers and more particularly to novel salts of condensation polymers.

It is one object of our invention to provide new salts of polymeric secondary amines which contain an aliphatic group derived from dimerized fat acids with dibasic acids. Another object is to provide such salts which are further reacted with a monoamine or monoacid.

Still another object of the present invention is to provide new and useful coatings, adhesives and corrosion inhibitors.

Various other objects and advantages of our invention will become apparent as this description proceeds.

We have discovered that polymeric secondary amines characterized by the recurring structural unit,

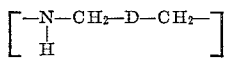

wherein D is a dimeric fat radical, can be reacted with dibasic acids to form salts which are useful in the preparation of baked films, adhesives and as corrosion inhibitors.

The polymeric secondary amines having the above described structural unit are conveniently prepared by the condensation polymerization of a fatty dinitrile derived from a dimerized fat acid. In addition to the homopolymer products prepared by the homo-condensation of a fatty dinitrile, copolymer products are also useful in preparing the salts of the present invention, said copolymers being prepared by the condensation copolymerization of a fatty dinitrile and a dinitrile copolymerizable therewith.

The condensation polymerization of the fatty dinitriles is accomplished by hydrogenating a fatty dinitrile under secondary-amine-forming conditions. By "secondary-amine-forming conditions" is meant that set of hydrogenation conditions under which a fatty nitrile preferentially forms a secondary amine rather than a primary amine. Non-polymeric secondary fatty amines derived from nitriles of monobasic acids are commercially available products and the conditions necessary to produce them are well understood in the art. Typical reaction conditions utilize hydrogen pressures in the range of 25 to 1000 p.s.i.g. at temperatures in the range of 200° to 290° C.

The preparative reaction is illustrated by the following equation:

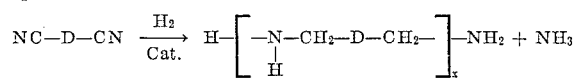

where D is a dimeric fat radical and X is the number of recurring units in the polymer chain. As illustrated in the equation, an ammonia by-product is formed. In order to obtain optimum yields of the desired polymer product, the ammonia by-product should be removed. Generally this is done by "sweeping" the reaction mixture with hydrogen gas.

Depending on the reaction conditions employed, the polymer products will vary in molecular weight from dimers in which X in the foregoing equation is 2, to high molecular weight products in which X is 40 or greater. The molecular weight of the polymer product can be varied by selection of the reaction conditions and catalyst. Raney nickel catalyst and mild reaction conditions tend to produce lower molecular weight polymers, while extremely severe reaction conditions produce insoluble cross-linked polymers. Copper-chromite catalysts (e.g.

Girdler catalyst G-13) tend to produce high molecular weight polymers which are not cross-linked. The lower molecular weight polymers are readily pourable, viscous liquids which resemble a heavy sirup. They are generally pale amber in color and are readily soluble in most common organic solvents. As the molecular weight increases, the products are generally more viscous and less soluble. Products in which X is about 20 are extremely viscous and are difficult to pour even when heated.

A hydrogenation catalyst is employed to carry out the condensation reactions. Generally, any nitrile hydrogenation catalyst can be employed. The preferred catalysts are Raney nickel and copper-chromite catalysts. Other suitable catalysts include Raney cobalt, platinum, palladium, palladium on charcoal, platinum on charcoal, nickel on kieselguhr, copper-nickel carbonate, cadmium-copper-zinc chromite, copper-nickel oxide, and the like.

The "copper-chromite catalyst" referred to above is often referred to as "copper-chromium oxide catalyst." Preparation of copper-chromite catalysts is discussed in an article by Connor, Folkers and Adkins, in the Journal of the American Chemical Society, vol. 54, pages 138–45 (1932) and in Reactions of Hydrogen With Organic Compounds Over Copper-Chromium Oxide and Nickel Catalysts by Homer Adkins, University of Wisconsin Press, Madison, Wis. (1937). The nature of this catalyst is further discussed in an article by Adkins, Burgoyne, and Schneider in the Journal of the American Chemical Society, vol. 72, pages 2226–29 (1950). Commercially available copper-chromite catalysts often contain amounts of catalyst stabilizers, e.g., barium oxide, calcium oxide, and magnesium oxide. Catalysts containing such stabilizers can be employed in the instant invention if desired. While many types of copper-chromite catalysts are commercially available and are generally useful in the instant invention, it is preferred to employ a catalyst containing 40 to 65% CuO (assuming all copper is present as CuO) and 35 to 60% $Cr_2O_3$ (assuming all chromium to be present as $Cr_2O_3$).

The amount of catalyst employed is not critical. However, the molecular weight and other properties of the polymer product will vary somewhat depending on the amount and type of catalyst used. Generally, catalyst in the amount of 1 to 10% by weight, based on the weight of the nitrile charge, is sufficient for most purposes. Larger and smaller amounts of catalyst can be employed if desired.

The dinitrile starting materials for preparing the polymeric secondary amines are the dinitriles prepared from dimerized fat acids. Relatively pure dimerized fat acids can be distilled from commercially available polymeric fat acid mixtures. The term "polymeric fat radical" as used herein refers to the hydrocarbon radical of a polymeric fat acid. The term "polymeric fat acid" refers to a polymerized fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be effected at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenc acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched and straight chain, poly and mono ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono- and polyunsaturated, are useful monomers for the preparation of the polymeric fat acids. Suitable examples of such materials include 10-undecynoic acid, tariric acid, stearolic acid, behenolic acid, and isamic acid.

Because of their ready availability and relative ease of polymerization, oleic and linoleic acid are the preferred starting materials for the preparation of the polymeric fat acids.

The dimerized fat acid is then converted to the corresponding dinitriles by reacting the dimerized fat acid with ammonia under nitrile-forming conditions. The details of this reaction are set forth in chapter 2 of Fatty Acids and Their Derivatives by A. W. Ralston, John Wiley & Sons, Inc., New York (1948). If desired, the dinitrile may then be purified to the desired degree by vacuum distillation or other suitable means. Generally, the high purity dinitrile tends to produce linear polymers of high molecular weight. If appreciable amounts of mononitrile are present, the polymer will be of low molecular weight, since these materials act as chain-stoppers. The presence of trinitriles and other higher poly-functional nitriles tends to produce a cross-linked polymer. A sufficient amount of trinitriles will provide a gelled product.

Copolymers can be prepared by copolymerizing mixtures of dinitriles. The desired dinitrile comonomer is added to the reaction mixture along with the fatty dinitrile. After subjecting the mixture to polymerization conditions, there is obtained a copolymer having randomly distributed recurring units:

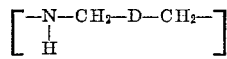

and

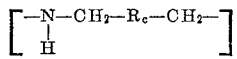

where D is a dimeric fat radical and $R_c$ is a divalent radical derived from the comonomer dinitrile. Generally, any copolymerizable dinitrile can be employed. Specific examples of simple nitriles which can be employed as comonomers include the dinitriles derived from such acids as adipic acid, pimelic acid, suberic acid, azelaic acid, and sebacic acid. Mixtures of two or more fatty dinitriles can also be copolymerized. A large variety of other dinitriles are likewise useful.

In theory, the formation of the polymeric amine proceeds through the preliminary reduction of a dinitrile to the diprimary diamine followed by conversion of the diprimary diamine to the polymeric secondary amine. Accordingly, this provides an alternate route for the preparation of the polymers. In the alternate route, the diprimary diamines are formed separately and then converted to the polymeric amines under the conditions previously described, although it is possible to use somewhat milder conditions. In this instance, it is possible to use a variety of other polyamines as comonomers including some comonomers such as metaxylylene diamines which may not be readily employed in the form of nitriles.

From a practical standpoint, there may be certain advantages in thus carrying out the preparation of the polymeric amines in two steps, since it makes possible the removal of any by-products formed in the first step, which is, the formation of the diprimary diamine, and thus enhances the purity of the final product. In addition, the milder conditions used to form the polymeric amine from the diprimary diamine result in less degradation and thus further enhance the purity of the final product.

Generally, the end groups of the polymers will be either amine groups or nitrile groups. Where the polymers are prepared by condensing amines, all the end groups will be primary amines:

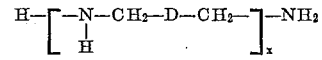

where D and X are as previously defined. Where a dinitrile is used as the starting material and the reaction conditions are mild and the reaction time is short, the end groups will be mainly nitrile groups:

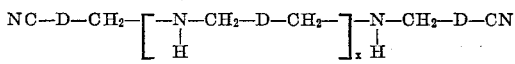

wherein D and X are as previously defined. When dinitriles are used as the starting material, under many reaction conditions a mixture of polymers will be obtained, some chains terminating in nitrile groups and other chains terminating in amine groups. Where severe reaction conditions are utilized, the degradation of functional groups may cause some chains to terminate in hydrocarbon groups.

The preparation of the polymeric secondary amines will be better understood with respect to the following examples which illustrate certain preferred embodiments of the present invention.

EXAMPLE A

Into a 1 liter stirred autoclave were charged 530 grams of distilled dimer nitrile prepared from dimerized fat acids consisting essentially of a mixture of dimerized linoleic and oleic acids and 25 grams of a commercially available copper-chromite catalyst "G-13." The autoclave was flushed with hydrogen, sealed under 150 p.s.i.g. hydrogen and rapidly heated to 200° C., at which time a continuous venting of hydrogen was begun such that the hydrogen coming into the autoclave was at 220 p.s.i. and the actual pressure in the autoclave was approximately 210 p.s.i. Heating was continued until the desired reaction temperature of 270° C. was reached. The hydrogenation was continued at this temperature for a period of 3 hours. The reaction mixture was then cooled to below 200° C. and the catalyst was filtered off. There was obtained a product having a Brookfield viscosity of 3,460 poises at 25° C. and a molecular weight of 5,700 by end group analysis. The product contained 13.1% primary amine groups, 77.5% secondary amine groups and 4.4% tertiary amine groups. The equivalent weight of the amine was 503.

EXAMPLE B

Into a 1 liter stirred autoclave were charged 530 grams of crude undistilled dimer nitrile prepared from vacuum stripped dimerized fat acids consisting essentially of a mixture of dimerized linoleic and oleic acids and 14 grams of water-wet Raney nickel catalyst. The autoclave was flushed with hydrogen, sealed under 150 p.s.i.g. hydrogen rapidly heated to 220° C., at which time a continuous venting of hydrogen was begun such that the hydrogen coming into the autoclave was at 240 p.s.i. and the actual pressure in the autoclave was approximately 230 p.s.i. The hydrogenation was then run at 270° C. for a period of 1.5 hours. After cooling and filtering to remove the catalyst, there was obtained a product having a Brookfield viscosity of 88.5 poises at 25° C. and a molecular weight of 2,500 by end group analysis. The product contained 19.0% primary amine groups, 60.5% secondary amine groups and 5.4% tertiary amine groups. The equivalent weight of the amine was 573.

EXAMPLE C

Example A was repeated except that the reaction time was increased to 5⅙ hours, the reaction temperature was 250° and the actual pressure in the autoclave was approximately 220 p.s.i. There was obtained a product having a Brookfield viscosity of 6,195 poises at 25° C. and a molecular weight of 11,000 by end group analysis. The product contained 6.5% primary amine groups, 85.9% secondary amine groups and 5.6% tertiary amine groups. The equivalent weight of the amine was 522.

EXAMPLE D

Into a 70 gallon pilot plant hydrogenation autoclave were charged 190 pounds of distilled dimer nitrile prepared from dimerized fat acids consisting essentially of a mixture of dimerized linoleic and oleic acids, and 4.8 pounds of Raney nickel catalyst (water-wet weight) which had been washed with absolute methanol until essentially free of water. The reaction conditions were essentially the same as those used in Example B except that the hydrogenation was run at 225–239° C. for a period of 6 hours and the pressure of the hydrogen in the autoclave was 200 to 220 p.s.i.g. The vented hydrogen in the system was recirculated after being passed through a scrubbing system for removal of the ammonia by-product. After cooling and filtering to remove thhe catalyst, there was obtained a pale yellow product having a Brookfield viscosity of 80 poises at 25° C. and a molecular weight by end group analysis of 3100. The product contained 18.6% primary amine groups, 63.7% secondary amine groups and 7.5% tertiary amine groups. The equivalent weight of the amine was 514.

EXAMPLE E

Into the same reactor as used in Example D were charged 250 pounds of distilled dimer nitrile prepared from dimerized fat acids consisting essentially of a mixture of dimerized linoleic and oleic acids and 12.5 pounds of "G–13" copper-chromite catalyst. The reaction conditions were the same as those used in Example D except that the hydrogenation was run at 225–230° C. for a period of 5 hours and the pressure of the circulating hydrogen was 200 p.s.i.g The reaction mixture was cooled to about 200° C. and then a 50/50 mixture of butanol and toluene was pumped into the autoclave to give an approximately 30% solids solution. The 30% solids solution was filtered to remove catalyst. The product (on a 100% solids basis) had the following analysis:

| | |
|---|---|
| Primary amine groups _____percent__ | 6.8 |
| Secondary amine groups _____do____ | 82.5 |
| Tertiary amine groups _____do____ | 4.9 |
| Brookfield viscosity (poises at 60° C.) _____ | 675 |
| Amine equivalent wt. _____ | 545 |
| Molecular weight (end group analysis) _____ | 8,300 |
| Color _____ | Almost black |
| Copper _____p.p.m__ | ≃8,000 |
| Chromium _____p.p.m__ | ≃1,100 |

EXAMPLE F

To 150 pounds of the 30% solids amine solution of Example E was added 150 pounds of a 50/50 mixture of butanol and toluene. The resulting 15% solids solution was mixed with 2.25 pounds of Filtrol Grade I (an acid activated mineral montmorillonite clay) and then warmed slightly (to about 50° C.) over a period of 30 minutes. Eighty six pounds of an 8.4% aqueous ammonium hydroxide solution was gradually added, with stirring, to the clay-amine-solvent mixture. The stirring was continued for about one hour and then the mixture was allowed to separate into an almost clear, very pale yellow organic layer and a lower blue aqueous alkaline layer containing most of the clay. The organic phase was separated from the aqueous phase and filtered. The product had substantially the same primary, secondary and tertiary amine group contents, molecular weight, viscosity and equivalent weight as the product of Example E, but contained only 32 p.p.m. copper and 129 p.p.m. chromium.

The polymeric secondary amines and preparation thereof are further described and claimed in the copending application of Leonard R. Vertnik, Ser. No. 136,426, filed Sept. 7, 1961, now Patent 3,217,028. The method of improving the color of said amines (see Example F) is further described and claimed in the copending application of Leonard R. Vertnik and Craig H. Brammer, Ser. No. 170,778, filed Feb. 2, 1962, now Patent 3,217,026.

In preparing the salts of the present invention, any dicarboxylic acid having from 2 to about 40 carbon atoms of aliphatic or aromatic structure, either substituted or unsubstituted, may be used. Among the preferred dicarboxylic acids are the following: succinic, sebacic, terephthalic, dimerized linoleic, adipic, glutaric, pimelic, suberic and azelaic. It is, of course, to be understood that in addition to the dicarboxylic acids referred to, other saturated or unsaturated dicarboxylic acids having straight or branched chains may be used, as well as acids having various substituents such as hydroxyl groups.

Since both the polymeric secondary amine and the dibasic acid have more than one functional group, they can be reacted in varying ratios to form salts which are essentially neutral, contain free acid groups or contain free amine groups. Generally, the ratio of equivalents of amine to acid will be in the range of about 2:1 to 1:2. Ratios of about 1:1 to 1:2 are preferred.

As indicated above, the salts of the present invention may contain free acid or amine groups depending upon the particular ratios of polymeric secondary amine and diacid used. In such cases, the salts may be further reacted with monoamines or monoacids to neutralize a part or all of the free acid or free amine groups. The monoamine reactants may be either primary or secondary amines which can be saturated or unsaturated, branched or straight chained, and unsubstituted or substituted with various substituents such as hydroxy groups. Representative of such amines are: ethylamine, diethylamine, butylamine, octylamine, dioctylamine, dodecylamine, ethanol amine and the like. The monoacid reactants are preferably monocarboxylic acids of about 2 to 22 carbon atoms. Said acids may be branched or straight chained and saturated or unsaturated. Likewise they may contain substituents such as chlorine and hydroxyl groups. Representative of such acids are: acetic, 2-ethyl hexanoic, dodecanoic, oleic and the like.

In addition to the above described variants, the polymeric secondary amines may be used in combination with other diamines and polyamines such as hexamethylene diamine, metaxylylene diamine, ethylene diamine, hydrazine, and the like. Mixtures containing up to about 75% by weight of these other polyamines with the polymeric secondary amines previously described may be employed.

The salts of the present invention are prepared by mixing the polymeric secondary amines with the dibasic acid at room temperature or with slight warming. If heating is employed, the temperature of the reaction mixture should be held below about 100° C. so as to prevent amide formation. The reaction is preferably conducted in solution. Suitable solvents are hydrocarbons such as benzene, toluene, petroleum hydrocarbons and the like and alcohols such as propanol and butanol. Mixtures of said solvents may also be used. The reaction of any free amine or acid groups with monoacids or monoamines is also conducted under the above described salt forming conditions. The other diamines or polyamines may be admixed with the polymeric secondary amine prior to the salt forming reaction or may be reacted with a partial salt of the polymeric secondary amine and diacid. In all cases, amide formation is to be avoided by the use of sufficiently low reaction temperatures.

The following examples serve to illustrate the present invention without, however, limiting the same thereto:

EXAMPLES 1–9

Salts of amines B–F and various diacids were prepared by reacting 1 equivalent of the amine with 1 equivalent of the acid. The reactants of Examples 1–6 were added to a suitable solvent and heated slightly to provide 25% solids solutions of the salts. The salts of Examples 7–9 were prepared at room temperature as 50% solids solutions. The particular reactants, solvents, solution appearance and viscosity are set forth in Table I.

TABLE I

| Example | Amine | Acid | Solvent | Appearance | Gardner Viscosity |
|---|---|---|---|---|---|
| 1 | B | Dimer Acid [1] | n-Propanol-Skellysolve B [2] | Clear | |
| 2 | C | do.[1] | do.[2] | Cloudy [3] | Z–1 |
| 3 | B | Adipic Acid | do.[2] | do.[3] | M–N |
| 4 | C | do. | Butanol-toluene [4] | Clear | O–P |
| 5 | C | Sebacic Acid | do.[4] | do. | Q–R |
| 6 | C | Azelaic Acid | do.[4] | do. | |
| 7 | D | Terephthalic Acid | do.[4] | do. | |
| 8 | E | do. | do.[4] | do. | |
| 9 | F | do. | do.[4] | do. | |

[1] This acid was the dimer of unsaturated fat acids having an acid number of 194.5 and an equivalent weight of 285.
[2] The volume ratio of n-propanol to Skellysolve B was 70:30. Skellysolve B is a commercially available aliphatic hydrocarbon solvent consisting mainly of hexane.
[3] Some solvent separation was evident in these examples.
[4] The butanol and toluene were used in a 50:50 volume ratio.

Coatings were prepared from some of the above salt solutions by laying down films thereof on tin plate using a 3 mil doctor blade. The coatings were baked for 15 minutes at 400° F., 30 minutes at 300° F. and 60 minutes at 300° F. The properties of the baked coatings are set forth in Tables II, III and IV.

TABLE II

| Example | Coating (15 min. at 400 °F.) | | |
|---|---|---|---|
| | Appearance | Tackiness | Pencil Hardness |
| 2 | Dull, rough | Slight | 2B |
| 3 | High Gloss | None | HB |
| 4 | do. | do. | HB |
| 5 | Med. gloss, small pits | do. | HB |
| 6 | Med. gloss | do. | HB |

TABLE III

| Example | Coating (30 min. at 300 °F.) | | |
|---|---|---|---|
| | Appearance | Tackiness | Pencil Hardness |
| 7 | High gloss | None | 2B |
| 8 | do. | do. | HB |
| 9 | do. | do. | B |

TABLE IV

| Example | Coating (60 min. at 300 °F.) | | |
|---|---|---|---|
| | Appearance | Tackiness | Pencil Hardness |
| 2 | | None | 6B |
| 3 | High gloss | do. | HB |
| 4 | do. | do. | HB |
| 5 | do. | do. | HB |
| 6 | do. | do. | HB |

In addition to the properties set forth in the above tables, all of the coatings had an extensibility of greater than 60%. These data show that the salts prepared from equivalent amounts of amine and diacid give good baked coatings. Those prepared from the higher molecular weight amines (Examples C, E and F) gave the best coatings.

The salts of the present invention are also very good adhesives for a variety of substrates and particularly for low-density polyethylene. This is shown by the following examples.

EXAMPLES 10–18

The salts of these examples were prepared by reacting amines D–F and adipic acid at varying equivalent ratios at room temperature. The reactants were added to a solvent mixture consisting approximately of 2 parts butanol and 1 part toluene by weight to provide 50% solids solutions (clear) of the salts. The salt solutions were then drawn on the treated side of 3 mil low-density polyethylene using a 1.5 mil doctor blade to give approximately 0.75 mil dry films. The coated polyethylene was allowed to dry overnight and then another sheet of treated 3 mil low-density polyethylene was bonded to the coated side of the first sheet. The peel strengths in grams/inch of the adhesives were then measured in an Instron testing machine at a rate of strain of 2 inches/minute. The particular amine, equivalent ratio of amine to acid and peel strength of the salts of the examples are set for in the following Table V.

TABLE V

| Example | Amine | Ratio, Equivalents Amine to Adipic Acid | Peel Strength (gms./in.) |
|---|---|---|---|
| 10 | D | 1:1 | 113 |
| 11 | D | 1:1.5 | 90 |
| 12 | D+F (50:50 by wt.) | 1:1 | 233 |
| 13 | D+F (50:50 by wt.) | 1:1.5 | 798 |
| 14 | F | 1:0.5 | 313 |
| 15 | F | 1:1 | 1,253 |
| 16 | F | 1:1.5 | 1,235 |
| 17 | E | 1:0.7 | 975 |
| 18 | E | 1:1 | 1,470 |

The above data show that the salts of the present invention are very good polyethylene adhesives. Salts prepared from equivalent amounts of the various amines and adipic acid give especially good results.

The adhesive properties of the salts can be further improved by incorporation therein of small amounts of metal compounds. Said compounds may be the oxides, hydroxides, or salts of rosin, naphthenic and aliphatic carboxylic acids of various metals including zinc, lead, manganese, cobalt, iron, calcium, barium, chromium, zirconium, copper and the rare earths. The free metals, in powder form, may also be used as well as mixtures of the various salts of the same or different metals. Preferred compounds are the metal naphthenates and aliphatic carboxylates. That the metal compounds improve the adhesive properties is evident from Examples 17 and 18 of Table V above. The salts of said examples were prepared from Amine E which contained about 8000 p.p.m. copper and 1100 p.p.m. chromium. This small amount of metal content came from the catalyst used in preparing the amines and was carried over into the salts prepared from said amines. The metal compounds are used in an amount sufficient to improve the adhesive properties of the amine salts. The amount will generally be within the range of about 0.01 to 1% by weight metal of the metal compound based on the weight of the amine salt. The following examples further illustrate the advantage of including a metal compound in the salts.

EXAMPLES 19–36

To portions of the salt solutions of Examples 10, 11 and 15 (all of these salts were prepared from equivalent amounts of amine and adipic acid) were added various metal compounds at a concentration of 0.06% by weight of metal based on the weight of the salt in the solutions. Low-density polyethylene was coated with these solutions as in Examples 10–18. The particular amine, particular metal compound and peel strength of the composiitons of these examples are set forth in the following Table VI.

TABLE VI

| Ex. | Amine | Metal Compound | Peel Strength [1] (gms./inch) |
|---|---|---|---|
| 19 | D | Mn Naphthenate | 142 |
| 20 | D+F (50:50 by wt.) | do | 793 |
| 21 | F | do | 1,377 |
| 22 | D | Co Naphthenate | 260 |
| 23 | D+F (50:50 by wt.) | do | 1,267 |
| 24 | F | do | 1,360 |
| 25 | D | Zr Naphthenate | 135 |
| 26 | D+F (50:50 by wt.) | do | 857 |
| 27 | D | Ba Naphthenate | 116 |
| 28 | D+F (50:50 by wt.) | do | 898 |
| 29 | F | do | 1,335 |
| 30 | D | Rare earth 2-ethyl hexoate | 116 |
| 31 | D+F (50:50 by wt.) | do | 867 |
| 32 | D | Cu Cyclohexane Butyrate | 150 |
| 33 | D+F (50:50 by wt.) | do | 857 |
| 34 | F | do | 1,333 |
| 35 | D | (Tris-2'-hydroxyaceto- phenone) Cr (III). | 840 |
| 36 | D+F (50:50 by wt.) | do | 1,127 |

[1] Rate of strain=2 in./min.

Some of the adhesive formulations of Tables V and VI were also used as adhesives for "Mylar" (polyester prepared from ethylene glycol and terephthalic acid—1 mil thickness), polypropylene (2 mil thickness), and linear polyethylene (commercially available under the name Conolex—1 mil thickness). The films were prepared and tested in the same manner as those of Tables V and VI except that said films were allowed to dry for about 60 hours instead of overnight before the second sheet of plastic was bonded thereto. The results of these tests are set forth in Table VII.

TABLE VII

| Adhesive Formulation | Peel Strength (gms./in.) | | |
|---|---|---|---|
| | Mylar | Prolypropylene | Linear Polyethylene |
| Exp. 35 | 273 | 747 | 573 |
| Exp. 23 | 1,365 | 1,042 | 1,150 |
| Exp. 36 | 867 | 807 | 927 |
| Exp. 15 | >2,000 | 1,571 | >2,000 |
| Exp. 21 | >2,000 | 1,913 | >2,000 |
| Exp. 18 | 875 | 1,027 | 390 |

The data of Table VII show that the adhesives of our invention can be used on a variety of substrates in addition to low-density polyethylene. The peel strength will depend somewhat on the drying time of the film. Thus, if the adhesive of Example 18 is allowed to dry only overnight before the second sheet of plastic is bonded thereto, peel strengths of >2000, 1873 and >2000 on "Mylar" polypropylene, and linear polyethylene, respectively, are obtained. Heat and vacuum can speed the drying time. This is shown by the data of the following Table VIII which was obtained by laying down films of the salts of Examples 15 and 18 on 3 mil treated low-density polyethylene and then drying said films in a vacuum oven at 50° C. Peel strength measurements were made on specimens withdrawn at the intervals indicated in the Table.

TABLE VIII

| Drying Time (min.) | Peel Strength (gms./inch) [1] | |
|---|---|---|
| | Salt of Exp. 15 | Salt of Exp. 18 |
| 10 | 700 | 513 |
| 30 | 826 | 673 |
| 60 | 1,120 | 953 |
| 120 | 1,627 | |
| 240 | | 1,247 |
| 480 | 1,780 | 1,627 |

[1] Rate of strain=2 in./min.

Salts of the polymeric secondary amines and acids other than adipic acid are also good adhesives as is shown by the following examples.

EXAMPLES 37–44

The salts of these examples were prepared by reacting amines E and F with equivalent amounts of various diacids at room temperature to provide 50% solids solutions in a solvent mixture consisting approximately of 2 parts butanol and 1 part toluene. Normal treated low-density polyethylene, linear polyethylene, polypropylene and "Mylar" were coated with the salts to provide 0.75 mil dry films (overnight dry) and then the peel strength was measured as in Examples 10–36. The particular amine, diacid, substrate and peel strength are set forth in the following Table IX.

TABLE IX

| Example | Amine | Diacid | Peel Strength (gms./in.) | | | |
|---|---|---|---|---|---|---|
| | | | Normal Poly-ethylene | Linear Poly-ethylene | Poly-propylene | "Mylar" |
| 37 | E | Azelaic | 1,513 | 1,320 | 1,440 | 1,980 |
| 38 | F | do | 1,640 | 1,520 | 1,640 | 1,300 |
| 39 | E | Succinic | >2,000 | >2,000 | 1,780 | >2,000 |
| 40 | F | do | 1,690 | >2,000 | 1,720 | 927 |
| 41 | E | Sebacic | 1,940 | | 1,680 | |
| 42 | F | do | 1,440 | 1,960 | 1,260 | >2,000 |
| 43 | E | Maleic | 1,880 | 1,620 | >2,000 | |
| 44 | F | do | 1,940 | | 1,580 | >2,000 |

The salts of our invention may be used as coating materials and as adhesives for combining a wide variety of substrate surfaces and materials such as paper, glass, cellophane, aluminum foil, cellulose acetate films, glassine, metal sheets, numerous synthetic polymeric substances in addition to those described in the examples, fabrics, wood and the like. The salts are applied to said materials by conventional procedures. Thus the salts may be used in emulsion form, solution form and so forth. The solutions can be applied by brushing, spraying, roller coating or other mechanical means. Suitable solvents include aliphatic and aromatic hydrocarbons, alcohols and the like. Illustrative of such solvents are benzene, toluene, Skellysolve B, heptane, isopropanol, n-propanol, butanol and mixtures thereof such as isopropanol-heptane, butanol-toluene, and the like. The concentration of the salt in the solvent is not critical, but is generally in the range of about 5 to 75% by weight and preferably in the range of about 15–60% by weight based on the total compositions. Pigments, fillers, and other known addition agents may also be admixed with the salts where desired.

It is to be understood that the invention is not to be limited to the exact details of operation or the exact compositions shown and described, as obvious modifications and equivalents will be apparent to those skilled in the art and the invention is to be limited only by the scope of the appended claims.

The embodiments of the invention in which an exclusive property or privilege is claimed are defined as follows:

1. A salt of adipic acid and a polymeric secondary amine having at least two recurring units of the structure

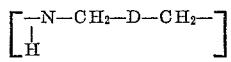

wherein D is the divalent hydrocarbon radical of a dimerized fat acid derived from a fat acid containing 8 to 24 carbon atoms, said polymeric secondary amine having been prepared by hydrogenating a compound selected from the group consisting of aliphatic dinitriles and aliphatic diprimary diamines at a hydrogen pressure in the range of about 25 to 1000 p.s.i. and a temperature in the range of about 200 to 290° C. while removing ammonia by sweeping the reaction mixture with hydrogen gas, the aliphatic groups of the said dinitriles and diamines being the same as D.

2. A salt of sebacic acid and a polymeric secondary amine having at least two recurring units of the structure

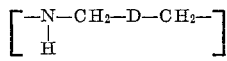

wherein D is the divalent hydrocarbon radical of a dimerized fat acid derived from a fat acid containing 8 to 24 carbon atoms, said polymeric secondary amine having been prepared by hydrogenating a compound selected from the group consisting of aliphatic dinitriles and aliphatic diprimary diamines at a hydrogen pressure in the range of about 25 to 1000 p.s.i. and a temperature in the range of about 200 to 290° C. while removing ammonia by sweeping the reaction mixture with hydrogen gas, the aliphatic groups of the said dinitriles and diamines being the same as D.

3. A salt of dimerized linoleic acid and a polymeric secondary amine having at least two recurring units of the structure

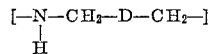

wherein D is the divalent hydrocarbon radical of a dimerized fat acid derived from a fat acid containing 8 to 24 carbon atoms, said polymeric secondary amine having been prepared by hydrogenating a compound selected from the group consisting of aliphatic dinitriles and aliphatic diprimary diamines at a hydrogen pressure in the range of about 25 to 1000 p.s.i. and a temperature in the range of about 200 to 290° C. while removing ammonia by sweeping the reaction mixture with hydrogen gas, the aliphatic groups of the said dinitriles and diamines being the same as D.

4. A salt of phthalic acid and a polymeric secondary amine having at least two recurring units of the structure

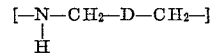

wherein D is the divalent hydrocarbon radical of a dimerized fat acid derived from a fat acid containing 8 to 24 carbon atoms, said polymeric secondary amine having been prepared by hydrogenating a compound selected from the group consisting of aliphatic dinitriles and aliphatic diprimary diamines at a hydrogen pressure in the range of about 25 to 1000 p.s.i. and a temperature in the range of about 200 to 290° C. while removing ammonia by sweeping the reaction mixture with hydrogen gas, the aliphatic groups of the said dinitriles and diamines being the same as D.

5. An adhesive composition comprising a major amount of a salt of a dicarboxylic acid containing from about 2 to 40 carbon atoms and a polymeric secondary amine having at least two recurring units of the structure

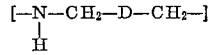

wherein D is the divalent hydrocarbon radical of a dimerized fat acid derived from a fat acid containing 8 to 24 carbon atoms, said polymeric secondary amine having been prepared by hydrogenating a compound selected from the group consisting of aliphatic dinitriles and aliphatic diprimary diamines at a hydrogen pressure in the range of about 25 to 1000 p.s.i. and a temperature in the range of about 200 to 290° C. while removing ammonia by sweeping the reaction mixture with hydrogen gas, the aliphatic groups of the said dinitriles and diamines being the same as D and a metal compound in an amount sufficient to improve the adhesive properties of the salt.

6. The adhesive composition of claim 5 wherein the equivalent ratio of dicarboxylic acid and polymeric secondary amine is about 1:1.

7. An adhesive composition comprising a major amount of a salt of a dicarboxylic acid containing from about 2 to 40 carbon atoms and a polymeric secondary amine having the randomly distributed recurring units

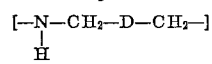

and

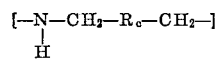

wherein D is the divalent hydrocarbon radical of a dimerized fat acid derived from a fat acid containing 8 to 24 carbon atoms and $R_c$ is a divalent hydrocarbon radical other than D, said polymeric secondary amine having been prepared by hydrogenating mixtures of compounds selected from the group consisting of (1) aliphatic dinitriles and copolymerizable dinitriles and (2) aliphatic diprimary diamines and copolymerizable diprimary diamines at a hydrogen pressure in the range of about 25 to 1000 p.s.i. and a temperature in the range of about 200 to 290° C. while removing ammonia by sweeping the reaction mixture with hydrogen gas, the aliphatic groups of the aliphatic dinitriles and aliphatic diprimary diamines being the same as D and the divalent hydrocarbon radical $R_c$ being contributed by the copolymerizable dinitriles and the copolymerizable diprimary diamines and a metal compound in an amount sufficient to improve the adhesive properties of the salt.

8. The method of forming a bond between sheet material comprising coating a first sheet of material with a solvent solution of a salt of a dicarboxylic acid containing from about 2 to 40 carbon atoms and a polymeric secondary amine having at least two recurring units of the structure

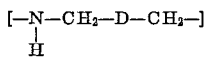

wherein D is the divalent hydrocarbon radical of a dimerized fat acid derived from a fat acid containing 8 to 24 carbon atoms, said polymeric secondary amine having been prepared by hydrogenating a compound selected from the group consisting of aliphatic dinitriles and aliphatic diprimary diamines at a hydrogen pressure in the range of about 25 to 1000 p.s.i. and a temperature in the range of about 200 to 290° C. while removing ammonia by sweeping the reaction mixture with hydrogen gas, the aliphatic groups of the said dinitriles and diamines being the same as D, drying said coating and applying a second sheet of material to the coated sheet.

9. The method of claim 8 wherein said sheet material is low-density polyethylene.

10. The method of forming a bond between sheet material comprising coating a first sheet of material with a solvent solution of the composition of claim 5, drying said coating, and applying a second sheet of material to the coated sheet.

11. The method of claim 10 wherein said sheet material is low-density polyethylene.

12. In a method of forming a bond between sheet material by applying a coating between the sheets and applying pressure, the improvement comprising employing as the coating a salt of a dicarboxylic acid containing from about 2 to 40 carbon atoms and a polymeric secondary amine having at least two recurring units of the structure

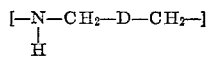

wherein D is the divalent hydrocarbon radical of a dimerized fat acid derived from a fat acid containing 8 to 24 carbon atoms, said polymeric secondary amine having been prepared by hydrogenating a compound selected from the group consisting of aliphatic dinitriles and aliphatic diprimary diamines at a hydrogen pressure in the range of about 25 to 1000 p.s.i. and a temperature in the range of about 200 to 290° C. while removing ammonia by sweeping the reaction mixture with hydrogen gas, the aliphatic groups of the said dinitriles and diamines being the same as D.

13. In a method of forming a bond between sheet material by applying a coating between the sheets and applying pressure, the improvement comprising employing as the coating the composition of claim 5.

14. The bonded sheet material prepared by the method of claim 12.

15. The bonded sheet material prepared by the method of claim 13.

16. A substrate coated with a salt of a dicarboxylic acid containing from about 2 to 40 carbon atoms and a polymeric secondary amine having at least two recurring units of the structure.

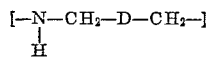

wherein D is the divalent hydrocarbon radical of a dimerized fat acid derived from a fat acid containing 8 to 24 carbon atoms, said polymeric secondary amine having been prepared by hydrogenating a compound selected from the group consisting of aliphatic dinitriles and aliphatic diprimary diamines at a hydrogen pressure in the range of about 25 to 1000 p.s.i. and a temperature in the range of about 200 to 290° C. while removing ammonia by sweeping the reaction mixture with hydrogen gas, the aliphatic groups of the said dinitriles and diamines being the same as D.

References Cited

UNITED STATES PATENTS

| | | | |
|---|---|---|---|
| 2,597,446 | 5/1952 | Bruce | 260—501 |
| 2,605,250 | 7/1952 | Hunter | 260—501 |
| 2,802,864 | 8/1957 | Vassel | 260—501 |
| 2,830,019 | 4/1958 | Fields et al. | 260—501 |
| 3,217,028 | 11/1965 | Vertnik | 260—465.5 |
| 2,435,553 | 2/1948 | Brunson et al. | 260—465.2 |
| 2,630,397 | 3/1953 | Cowan et al. | 260—18 |
| 2,705,227 | 3/1955 | Stamatoff | 260—18 |
| 2,772,179 | 11/1956 | Kalinowski et al. | 260—404.5 |
| 2,824,848 | 2/1958 | Wittcoff | 260—18 |

FOREIGN PATENTS

| | | |
|---|---|---|
| 845,560 | 8/1960 | Great Britain. |
| 529,125 | 8/1956 | Canada. |

OTHER REFERENCES

Noller, Chemistry of Organic Chemistry, W. B. Saunders Company, Philadelphia, 1951, 885 pages, pp. 233 and 234 relied upon.

DONALD E. CZAJA, *Primary Examiner.*

LEON J. BERCOVITZ, *Examiner.*

R. W. GRIFFIN, *Assistant Examiner.*